United States Patent
Condorelli et al.

(10) Patent No.: US 8,832,696 B2
(45) Date of Patent: Sep. 9, 2014

(54) ADAPTIVE CHANNEL FOR ALGORITHMS WITH DIFFERENT LATENCY AND PERFORMANCE POINTS

(75) Inventors: Vincenzo Condorelli, Poughkeepsie, NY (US); Silvio Dragone, Winterthur (CH); Tamas Visegrady, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 885 days.

(21) Appl. No.: 12/976,194

(22) Filed: Dec. 22, 2010

(65) Prior Publication Data

US 2012/0167097 A1    Jun. 28, 2012

(51) Int. Cl.
*G06F 9/46*    (2006.01)
(52) U.S. Cl.
CPC ........................................ *G06F 9/46* (2013.01)
USPC .......................................... 718/101; 718/102

(58) Field of Classification Search
None
See application file for complete search history.

(56) References Cited

U.S. PATENT DOCUMENTS

| | | | |
|---|---|---|---|
| 6,075,994 A * | 6/2000 | Bhat | 455/458 |
| 6,434,631 B1 * | 8/2002 | Bruno et al. | 710/6 |
| 7,796,536 B2 | 9/2010 | Roy et al. | |
| 7,853,678 B2 | 12/2010 | Khemani et al. | |
| 2007/0266385 A1 * | 11/2007 | Flautner et al. | 718/102 |

* cited by examiner

*Primary Examiner* — Meng An
*Assistant Examiner* — Wissam Rashid
(74) *Attorney, Agent, or Firm* — Cantor Colburn LLP; Daniel Morris

(57) ABSTRACT

A method for processing requests in a channel can include receiving a first request in the channel, running calculations on the first request in a processing time $T_P$, in response to a receipt of a plurality of subsequent requests, creating a batch, adding each of the plurality of subsequent requests to the batch and processing the batch in a time $T_B$.

20 Claims, 4 Drawing Sheets

ADAPTIVE CHANNEL FOR ALGORITHMS WITH DIFFERENT LATENCY AND PERFORMANCE POINTS

BACKGROUND

The present invention relates to cryptography, and more specifically, to channels with adaptive throughput optimization of algorithms with different latency/performance points Many cryptographic operations implement algorithms with a wide range of latency/performance tradeoffs, or allow radically different optimization capabilities depending on the number of simultaneously processed requests. Typically, the latency, performance and optimization choices are made at build time, performing sub-optimally if used with different workload profiles. Alternatively, software is made aware of the available implementations and tradeoffs, and selects implementations at runtime with significant complexity. While such software implementations may be extremely effective, they are typically tightly integrated with request flow control, and therefore are non-portable, or difficult to cleanly separate from host infrastructure.

What is needed is am adaptive method to optimize algorithms.

SUMMARY

Exemplary embodiments include a method for processing requests in a channel, the method including receiving a first request in the channel, running calculations on the first request in a processing time $T_P$, if subsequent requests are not received in a predetermined time window, in response to a receipt of a plurality of subsequent requests, creating a batch, adding each of the plurality of subsequent requests to the batch and processing the batch in a time $T_B$, in response to at least one of a timeout of the batch and a capacity of the channel is reached.

Additional exemplary embodiments include a computer program product for processing requests in a channel, the computer program product including a non-transitory computer readable medium having instructions for causing a computer to implement a method, the method including receiving a first request in the channel, running calculations on the first request in a processing time $T_P$, if subsequent requests are not received in a predetermined time window, in response to a receipt of a plurality of subsequent requests, creating a batch, adding each of the plurality of subsequent requests to the batch and processing the batch in a time $T_B$, in response to at least one of a timeout of the batch and a capacity of the channel is reached.

Further exemplary embodiments include a system for processing requests in a channel, the system including a processor configured to receive a first request in the channel, run calculations on the first request in a processing time $T_P$, if subsequent requests are not received in a predetermined time window, in response to a receipt of a plurality of subsequent requests, create a batch, add each of the plurality of subsequent requests to the batch and process the batch in a time $T_B$, in response to at least one of a timeout of the batch and a capacity of the channel is reached, wherein the batch is launched in response to a time T being equal to $T_Q - T_B$, where T is the time after receipt of the first request in the channel.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments include systems and methods, which can include corresponding interfaces, and which resemble "dumb" channels, which reconfigure themselves adaptively to match workloads for operations that may benefit from batching. The exemplary channel allows transparent throughput optimization with simple status feedback, allowing simple host code to manage multiple channels in a system-wide workload management scheme. The channel itself includes modest computing and storage resources.

In further exemplary embodiments, the systems and methods described herein can offer limited quality-of-service (QoS) guarantees, restricted to a build-time known number of outstanding requests, as a side effect of its adaptive nature, if sufficient channel-local storage is available. The systems may transparently fall back to "best-effort" (BE) mode, still reducing expected latencies, but without upper bounds. Providing continuous and per-request feedback about the state and availability of QoS requests, simple host code may virtualize the channels as a mixture of QoS and BE channels, or multiple priority levels.

In exemplary embodiments, the systems and methods described herein migrate much of the complexity of throughput optimization to within the self-optimizing channel. As such, the systems and methods described herein do not require the complexity of a standalone system-level scheduler. The simplified interface may be efficiently implemented by host code much simpler than required by "adaptive batching" or similar global algorithm. The reason for such simplification is the typical environment where such batch-optimization happens, which generally contains simple hardware of little or no internal processing/storage capability. As such, there is an advantageous trade-off between the global scheduling complexity and a modest additional channel state.

Figure 1:
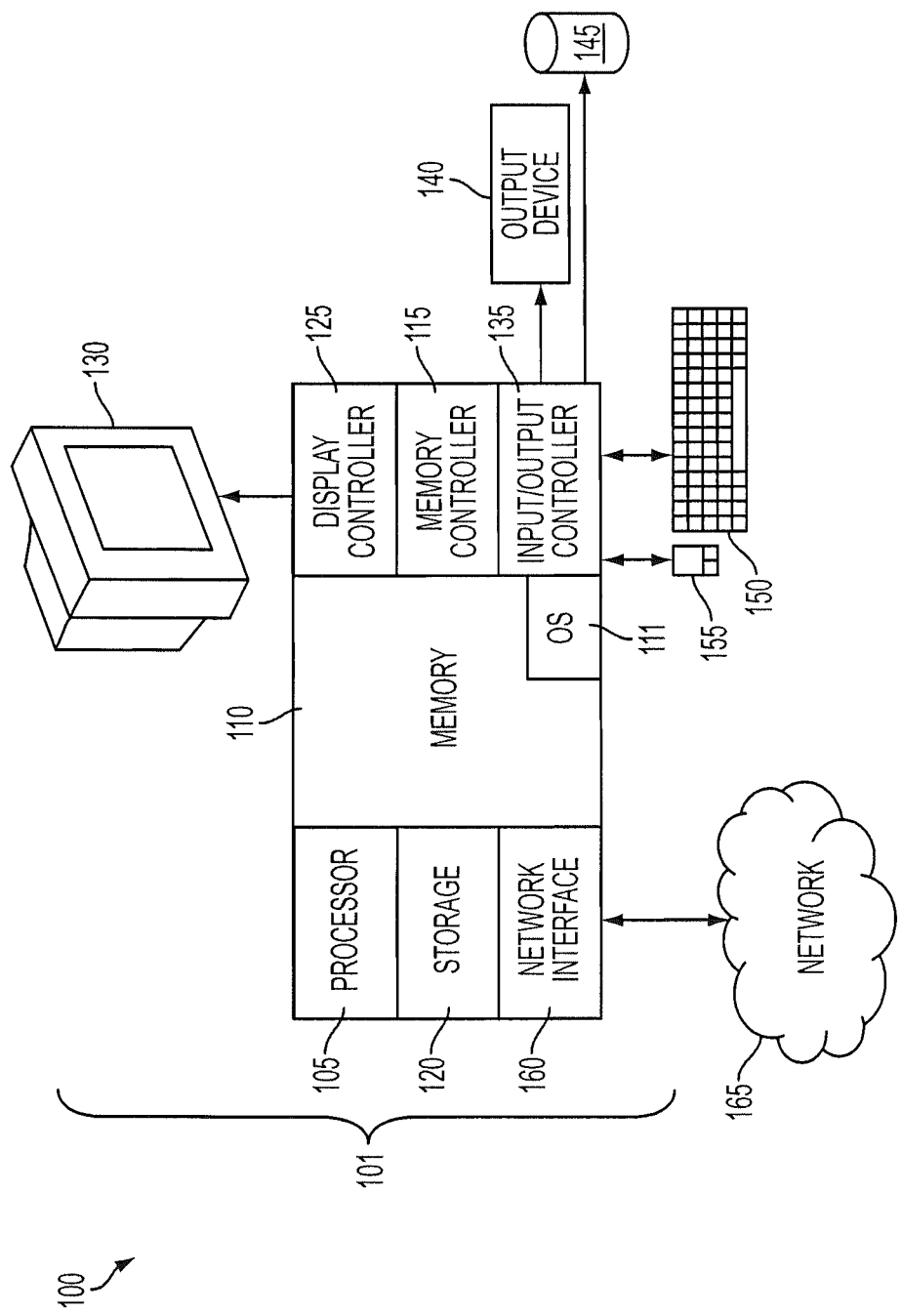
FIG. 1 illustrates an exemplary embodiment of a system for channels with adaptive throughput optimization of algorithms with different latency/performance points.

The exemplary methods described herein can be implemented in any general purpose computing system that can support cryptographic acceleration for algorithms that implement smart cards. FIG. 1 illustrates an exemplary embodiment of a system 100 for channels with adaptive throughput optimization of algorithms with different latency/performance points. It will be appreciated that the methods described herein are largely non-interactive, and automated such as a server or embedded system. In exemplary embodiments, the methods described herein can be implemented either in an interactive or non-interactive system. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 140, 145 can be any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 1, the software in the memory 110 includes the adaptive channel methods described herein in accordance with exemplary embodiments and a suitable operating system (OS) 111. The OS 111 essentially controls the execution of other computer programs, such the adaptive channel systems and methods as described herein, and provides scheduling, input-output control, file and data management, memory management, and communication control and related services.

The adaptive channel methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the OS 111. Furthermore, the adaptive channel methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. As described herein the I/O devices 140, 145 can be any generalized cryptographic card or smart card known in the art. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The adaptive channel methods described herein and the OS 111, in whole or in part, but typically the latter, are read by the processor 105, perhaps buffered within the processor 105, and then executed.

When the systems and methods described herein are implemented in software, as is shown in FIG. 1, the methods can be stored on any computer readable medium, such as storage 120, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the adaptive channel methods are implemented in hardware, the adaptive channel methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

It is to be appreciated that any cryptographic algorithm can benefit from the systems and methods described herein. As such, for whatever reasons cryptography is being implemented, the systems and methods described herein can be applied to the cryptographic implementation because the algorithms are bit sliced, and the systems and methods described herein can operate on a single bit stream and decompose the cryptographic problem to process the stream one bit at a time. As described further herein, the exemplary adaptive channel receives several requests, and as requests in the adaptive channel increase, throughput of the channel increases.

In exemplary embodiments, the systems and methods described herein can process algorithms with modest input size, specifically not implementing streaming. Processing can be stateless, requiring no state storage or interaction between different requests. Algorithms are implemented in which multiple inputs may be "batched", or processing may otherwise benefit from simultaneous access to multiple inputs. Algorithms can include deterministic latency bounds. More granular bounds can be processed, depending on operation sub-type, such as differentiating based on input size. A QoS channel of limited capacity with a latency bound $T_Q$ somewhat higher than the worst-case processing latency can be implemented as further described herein. The latency difference allows the systems and methods to batch requests if they fall within the same processing window, or to pre-compute in an anticipatory manner for input(s) already visible to the channel. In exemplary embodiments, substantial processing is implemented within the adaptive channel, even if some other provider—such as a cryptographic engine—completes the actual operation itself. Specifically, pre-computation, or other steps can be implemented within the channel itself. Simple status indicators can be included in the system 100 such as on the display 130, and can show channel state, number of pending requests, and completion time. Based on a small number of such indicators, host libraries in the memory 110 may easily adapt their workload targeting to a changing system state. The exemplary systems and methods can deliver responses out-of-order. Since processing is stateless, requests can be processed out of order. In exemplary embodiments, responses can be returned directly on a per-request basis, not forcing serialization, for example.

In exemplary embodiments, the systems and methods described herein can include "sub-channels", specialized for particular subsets of inputs. For example, an elliptic-curve implementation may need to calculate modular inverses with one of few, fixed prime number bases. Such an implementation could offer several sub-channels of a generic "modular inverse" channel, each inverting modulo a fixed prime. Such sub-channels would reduce input size—embedding fixed inputs into the implementation instead—and as a side effect, automatically separate inputs to different queues where batching is always possible.

Figure 2:
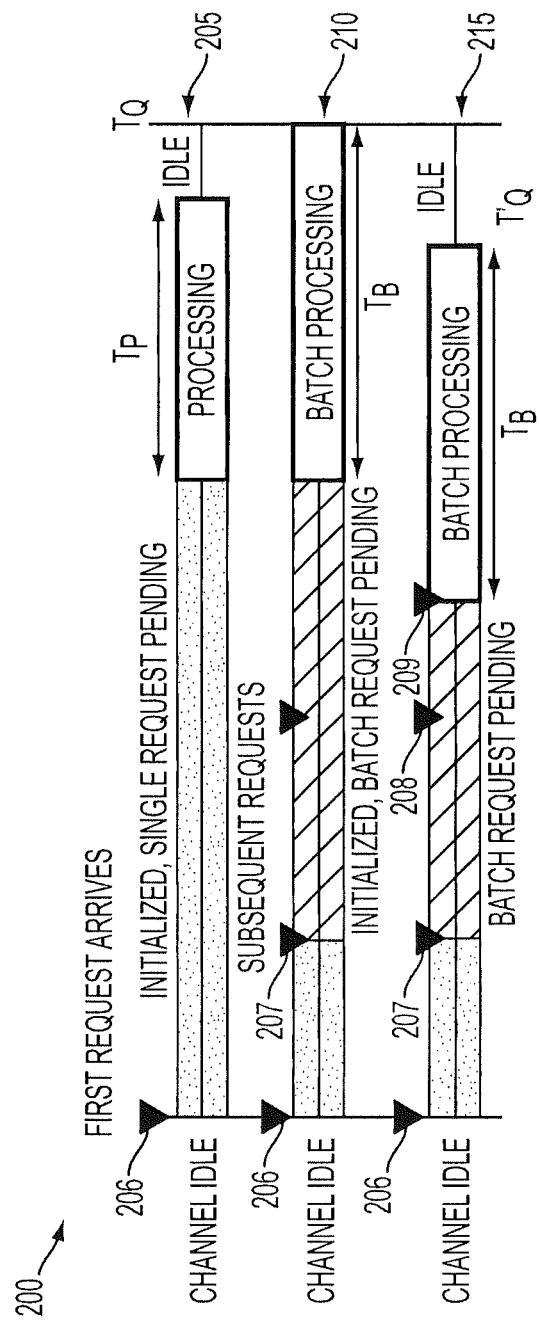
FIG. 2 illustrates an example of a logical flow within a state machine in accordance with exemplary embodiments.

FIG. 2 illustrates an example of a logical flow 200 within a state machine in accordance with exemplary embodiments. In exemplary embodiments, an exemplary adaptive channel is configured to receive the requests from some cryptographic algorithm. At first as shown in flow portion 205, the idle channel upon receiving a first request 206, enters an "input-collecting" state. In a QoS channel, the system 100 can offer to return the response in $T_Q$ time, if the single-request processing time is $T_P < T_Q$. The system 100 operates as if the batched processing time is somewhat higher, $T_B > T$. If no subsequent request appears before $T_Q - T_B$, the system 100 performs a single-instance calculation, as shown in the flow portion 205, entering the "processing state". The system 100 returns the result before $T_Q$. Requests arriving in the processing state are delayed, or background-processed, depending on available hardware in the system 100. If subsequent, batchable requests arrive in the input-collecting state, the system 100 creates a batch for them. Any batch-mandated pre-processing is started immediately, upon arrival of subsequent requests. Subsequent inputs are merged into batch-specific combined state as they arrive. The system 100 launches the batch if it reaches $T_Q - T_B$ after receiving the first request 206, but without filling batch capacity as shown in flow portion 210, and if channel capacity is four or more. Flow portion 210 shows several subsequent requests 207, 208. In this case, batch utilization can be sub-optimal, still benefits from the reduced per-request latency, and provides multiple responses at $T_Q$. Once a sufficient number of requests 206, 207, 208, 209 has arrived to complete the batch, the system 100 starts compound processing immediately as shown in flow portion 215, with the channel capacity as four, starting processing when N=4 requests have arrived. The system 100 produces batch output at $T'_Q \leq T_Q$.

In exemplary embodiments, the system 100 includes a channel-status indicator (which can be on the display 130), showing remaining QoS capability, and remaining input-collection time. With these indicators, host libraries in the memory 110 may adapt request dispatch to available system capability without detailed bookkeeping. The system 100 can move some administration to the adaptive channel, offering a detailed view on per-channel utilization in simplified, immediately usable form. As such, the system 100 includes channel-integrated load management. As such, the system 100 may transparently adapt to host loads changing between continuous utilization and widely spaced, single requests. Since the system 100 internally implements batching, allowing the system 100 to dynamically select the currently best dispatch strategy, the system 100 requires minimal host cooperation to maximize global channel throughput.

As discussed herein, the throughput of the exemplary adaptive channels increases as the channel is almost full. As such, with the remaining-time indicator, which can be on the display 130, it is beneficial to prefer almost-full channels instead of initializing idle ones, as their incremental processing within an already existing batch would be small. These changes can modify cross-channel scheduling, but they may be easily accommodated in most present systems.

In exemplary embodiments, the system 100 can implement a system-level request-dispatch strategy. If all adaptive channels in the system 100 have identical capacity, dispatches attempt to keep as many channels at maximum capacity as possible, as batch overhead can decrease with batch size. The exemplary status indicators, report utilization and completion time. As such, dispatch may implement the indicators into any online algorithm for the solution of the bin-packing problem, which may be approximated with strict upper bounds. At a second level, once the system 100 gives preference to best-fit selection, the system 100 can add load-balancing across channels, such as selecting between tied best-fit candidates with simple round-robin assignment.

Figure 3:
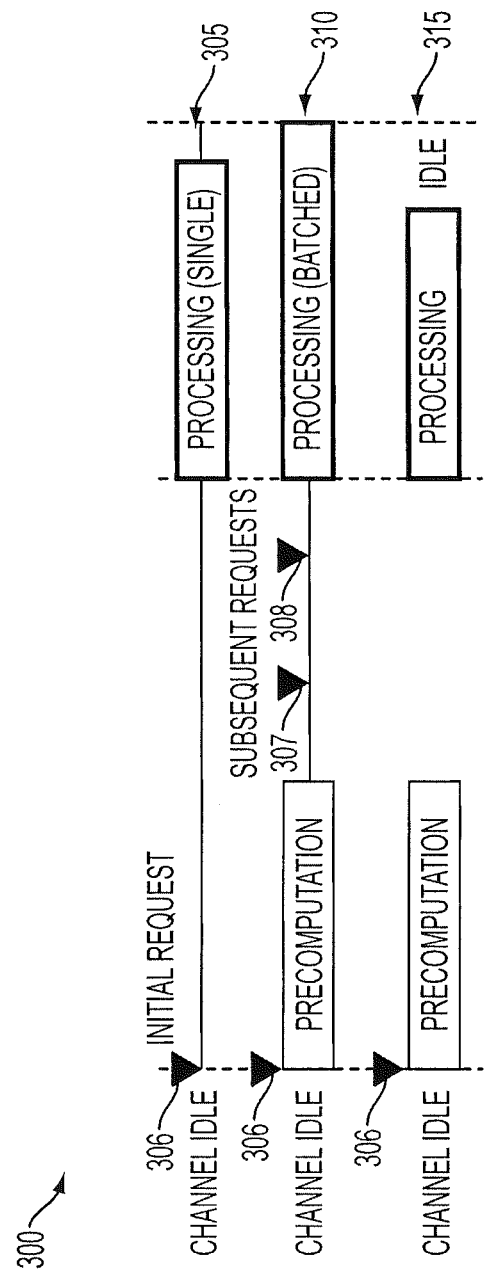
FIG. 3 illustrates another example of a logical flow within a state machine in accordance with exemplary embodiments.

As described above, FIG. 2 illustrates an example of a logical flow 200 within a state machine in which requests are received and processed. In other exemplary embodiments, algorithms to be processed can also be pre-computed. The system 100 accommodates algorithms accelerated by input-dependent pre-computation. In exemplary embodiments, expected performance can be improved even if the pre-computation does not benefit batched processing. In exemplary embodiments, the system 100 can begin pre-computation as soon as the first input arrives as shown in FIG. 3, which illustrates another example of a logical flow 300 within a state machine in accordance with exemplary embodiments. Flow portion 305 illustrates a similar case as in flow portion 205 in FIG. 1 in which a single request 306 is received and processed. In exemplary embodiments, the system 100 can also implement pre-computation in multiple ways, depending on the relative processing speed of batched, original and pre-computed implementations. If subsequent inputs (e.g., requests 307, 308) arrive in the availability window as shown in flow portion 310, the system 100 stops pre-computation, discarding results, and completes a regular batched computation. As described herein, the system 100 accommodates batched-processing overhead. The system 100 therefore starts batched processing at $T_Q - T_B$, as shown illustrated in and described with respect to FIG. 2. If no subsequent inputs arrive by $T_Q - T_B$, the system 100 processes the single input request 306, starting at $T_B$ (as illustrated in flow portion 315.

The system 100 terminates processing before the original request 206 as shown in flow portion 305 releasing the channel early. In exemplary embodiments, the system 100 accommodates online pre-computation if effort is incremental for multiple inputs. Since in the online case, pre-computation may always be possible, it may be trivially integrated, and the change in $T_P$ considered during sizing.

In exemplary embodiments, the system 100 can implement any algorithm which may be "batched" (i.e., accelerated through simultaneous processing of multiple inputs, processed in bitsliced implementations in parallel), or may be implemented at widely varying performance ranges for identical inputs. Suitable algorithms include but are not limited to batched multiplication on elliptic curves, modular exponentiation or inversion, many symmetric cryptographic primitives, and Galois field multiplication. If pre-computation is supported, the system 100 may selectively combine pre-computation with runtime time/performance optimization, even if pre-computation may not benefit the multiple-input case. For example, the system 100 may start pre-computation for the first input, but discard it and switch to a batched algorithm with higher aggregate throughput if subsequent inputs arrive. If no further inputs arrive, the system 100 gains the benefits for the single input that the system 100 is processing. Depending on the algorithm, the modest increase in additional processing may be acceptable, if the system 100 processes a significant number of single-input "batches".

In exemplary embodiments, the QoS implementation can provide sub-channels with immediate processing, that is, a high-priority QoS channel, not different from storage-less, direct request/response architectures as known in the art. The presence of such immediate responses degrades the QoS limits, in a way which may be calculated at build time. In exemplary embodiments, immediate channel capacity can be limited, or can have combined immediate-and-QoS system capability. Host code could accommodate both scenarios, creating even more possible system priorities for its callers.

In other exemplary embodiments, the system 100 can adapt to potentially long-running operations, allowing the system 100 to tolerate operations with potentially unbounded latency. If the system 100 implements potentially long-running operations, by processing in bounded-time pieces, the adaptive channel can accommodate such extensions with host assistance. The system 100 could provide channel inputs where iteration count may be limited on a per-request basis. Host libraries could then turn long-running operations into multiple serialized, incremental calls of the system 100, with the channel itself processing only operations of build-time fixed latencies.

In exemplary embodiments, the system 100 can receive responses in arbitrary order, such as directly DMAed into caller buffers. The system 100 can be augmented with an output-reordering stage, if in-order processing is required in a particular implementation. Output buffering within the channel is feasible for short, stateless responses, and can be added without disrupting the system 100. Although in-order delivery could prohibit QoS guarantees or extend QoS latency limits based on system size, the system 100 would still benefit from the average-latency reduction caused by batching.

In other exemplary embodiments, if the channel processes requests from high-availability/redundant hosts, such as multiple processors in lockstep, the system 100 can be implemented with "negative channel affinity", submitting multiple instances of the same request to different channels. Passing requests through different hardware ensures they will diverge if any channel develops a persistent error, which, otherwise, would produce identically bad responses from within that channel. Such originator-channel binding could be added to load-balancing host code, improving error resiliency of the entire system 100.

Figure 4:
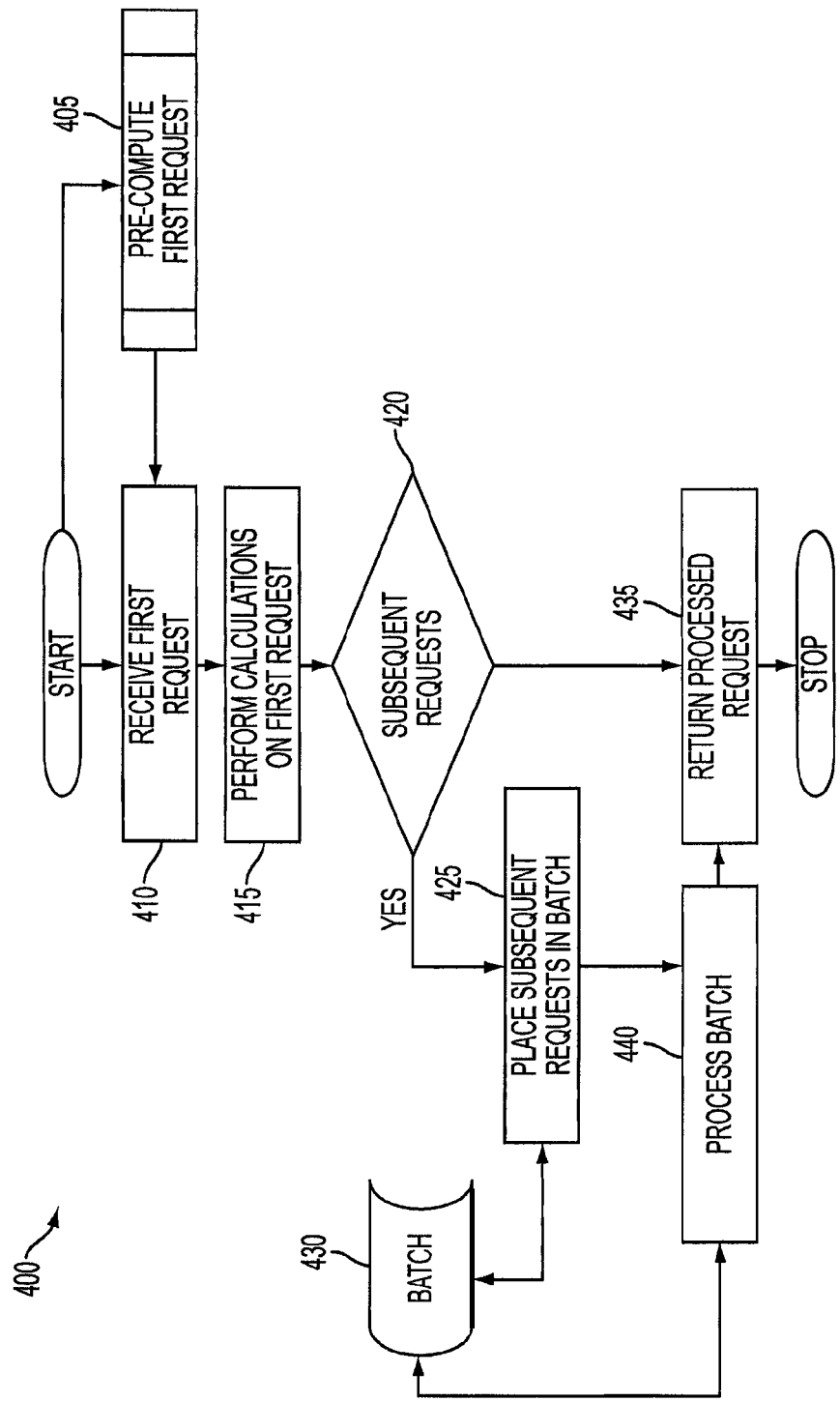
FIG. 4 illustrates a flow chart of a method for processing requests in an exemplary adaptive channel as described herein.

FIG. 4 illustrates a flow chart of a method 400 for processing requests in an exemplary adaptive channel as described herein. At block 410, the channel receives a first request. As described herein, pre-computations can first be performed on the request at block 405. At block 415, the channel performs calculations on the first request. At block 420, the method determines if there are subsequent requests received in the channel. If there are subsequent requests received at block 420, then at block 425 subsequent requests are placed into a batch 430 a described herein. As described herein, the first request is processed at block 435 and the batch is processed at block 440. As described herein, the processed request can be returned in a QoS time $T_Q$, wherein $T_P < T_Q$. In addition, the batch can be launched in response to a time T being equal to $T_Q - T_B$, where T is the time after receipt of the first request in the channel. In addition, calculations can be run on the first request in response to a receipt no other of the plurality of subsequent requests in a time $T_Q - T_B$. In addition, the method 400 can delay running calculations on the plurality of subsequent requests in response to receiving one or more of the plurality of subsequent requests while running calculations on the first request.

Technical effects include the implementation of cryptographic request processing in a single adaptive channel whose throughput increases with increased workload in the channel. Multiple requests can be batched and processed simultaneously. Pre-computation can also be implemented in present in a given algorithm and can be advantageously abandoned upon the arrival of subsequent requests in the channel, and can be batched accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for processing requests in a channel, the method comprising:
   receiving a first request in the channel;
   based on determining that no subsequent requests are received in a predetermined time window, running calculations on the first request in a processing time TP; and
   based on receiving at least one of a plurality of subsequent requests prior to the expiration of the predetermined time window:
      creating a batch;
      adding the first request and each of the plurality of subsequent requests to the batch; and
      processing the batch in a time TB, in response to at least one of a timeout of the batch and a capacity of the channel is reached,
   wherein the predetermined time window is equal to TQ−TB, where TQ is a Quality of Service (QoS) time requirement in which at least one of the processed first request and the processed batch is returned.

2. The method as claimed in claim 1 wherein the channel is a Quality of Service (QoS) channel.

3. The method as claimed in claim 2 further comprising returning the first request as a processed request.

4. The method as claimed in claim 3 wherein the processed request is returned in a QoS time TQ, wherein TP<TQ.

5. The method as claimed in claim 4 further comprising launching the batch in response to a time T being equal to TQ−TB, where T is the time after receipt of the first request in the channel.

6. The method as claimed in claim 4 wherein the calculations are run on the first request in response to a determination that no other of the plurality of subsequent requests were received in a time TQ−TB.

7. The method as claimed in claim 1 further comprising delaying running calculations on the plurality of subsequent requests in response to receiving one or more of the plurality of subsequent requests while running calculations on the first request.

8. The method as claimed in claim 1 further comprising initiating pre-computation calculations on the first request.

9. A computer program product for processing requests in a channel, the computer program product including a non-transitory computer readable medium having instructions for causing a computer to implement a method, the method comprising:
   receiving a first request in the channel;
   based on determining that no subsequent requests are received in a predetermined time window, running calculations on the first request in a processing time; and
   based on receiving at least one of a plurality of subsequent prior to the expiration of the predetermined time window:
      creating a batch;
      adding the first request and each of the plurality of subsequent requests to the batch; and
      processing the batch in a time TB, in response to at least one of a timeout of the batch and a capacity of the channel is reached,
   wherein the predetermined time window is equal to TQ−TB, where TQ is a Quality of Service (QoS) time in which at least one of the processed first request and the processed batch is returned.

10. The computer program product as claimed in claim 9 wherein the channel is a Quality of Service (QoS) channel.

11. The computer program product as claimed in claim 10 wherein the method further comprises returning the first request as a processed request.

12. The computer program product as claimed in claim 11 wherein the processed request is returned in a QoS time TQ, wherein TP<TQ.

13. The computer program product as claimed in claim 12 further comprising launching the batch in response to a time T being equal to TQ−TB, where T is the time after receipt of the first request in the channel.

14. The computer program product as claimed in claim 12 wherein the calculations are run on the first request in response to a determination that no other of the plurality of subsequent requests were received in a time TQ−TB.

15. The computer program product as claimed in claim 9 wherein the method further comprises delaying running calculations on the plurality of subsequent requests in response to receiving one or more of the plurality of subsequent requests while running calculations on the first request.

16. The computer program product as claimed in claim 9 further comprising initiating pre-computation calculations on the first request.

17. A system for processing requests in a channel, the system comprising:
   a processor configured to:
   receive a first request in the channel;
   based on determining that no subsequent requests are received in a predetermined time window, run calculations on the first request in a processing time TP; and
   based on receiving at least one of a plurality of subsequent requests prior to the expiration of the predetermined time window:
      create a batch;
      add the first request and each of the plurality of subsequent requests to the batch; and
      process the batch in a time TB, in response to at least one of a timeout of the batch and a capacity of the channel is reached;
   wherein the batch is launched in response to a time T being equal to TQ−TB, where T is the time after receipt of the first request in the channel and where TQ is a Quality of Service (QoS) time in which the processed request is returned.

18. The system as claimed in claim 17 wherein the channel is a Quality of Service (QoS) channel.

19. The system as claimed in claim 18 wherein the calculations are run on the first request in response to a determination that no other of the plurality of subsequent requests were received in a time TQ−TB.

20. The system as claimed in claim 18 wherein the processor is further configured to:
   initiate pre-computation calculations on the first request;
   delay running calculations on the plurality of subsequent requests in response to receiving one or more of the plurality of subsequent requests while running calculations on the first request; and
   return the first request as a processed request,
wherein the processed request is returned in a QoS time TQ, wherein TP<TQ.

* * * * *